US012809678B2

(12) United States Patent
Addepalli et al.

(10) Patent No.: US 12,809,678 B2
(45) Date of Patent: Nov. 24, 2026

(54) SYSTEM AND METHOD FOR CENTRALIZING RULE GENERATION ACROSS MULTIPLE SYSTEMS VIA MICROSERVICE

(71) Applicant: JPMorgan Chase Bank, N.A., New York, NY (US)

(72) Inventors: Srikanth Addepalli, Katy, TX (US); Raghavendra L R Sekhar Talatam, Fulshear, TX (US); Uma Arvinth, Fulshear, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 634 days.

(21) Appl. No.: 18/228,249

(22) Filed: Jul. 31, 2023

(65) Prior Publication Data

US 2025/0045106 A1 Feb. 6, 2025

(51) Int. Cl.
*G06F 9/50* (2006.01)
*G06Q 30/0601* (2023.01)

(52) U.S. Cl.
CPC .......... *G06F 9/5027* (2013.01); *G06F 9/5072* (2013.01); *G06Q 30/0621* (2013.01)

(58) Field of Classification Search
None
See application file for complete search history.

(56) References Cited

U.S. PATENT DOCUMENTS

| | | | | |
|---|---|---|---|---|
| 9,037,870 | B1 * | 5/2015 | Zheng | H04L 9/0891 380/42 |
| 9,165,324 | B1 * | 10/2015 | Syed | G06Q 40/08 |
| 10,616,281 | B1 * | 4/2020 | Chud | H04L 63/107 |
| 11,301,937 | B1 * | 4/2022 | Bertoglio | G06F 16/9035 |
| 2010/0185963 | A1 * | 7/2010 | Slik | G06F 16/278 715/764 |
| 2017/0116428 | A1 * | 4/2017 | Wu | G06F 21/6209 |
| 2021/0365801 | A1 * | 11/2021 | Dickens | G06F 9/505 |
| 2022/0006705 | A1 * | 1/2022 | Padmanabhan | H04L 9/3239 |
| 2022/0253323 | A1 * | 8/2022 | Makhija | G06F 9/44521 |

* cited by examiner

*Primary Examiner* — Abu Zar Ghaffari
(74) *Attorney, Agent, or Firm* — Greenblum & Bernstein, P.L.C.

(57) ABSTRACT

A method and system for centrally modifying a rule in a product definition are disclosed. The method includes receiving, from a user, a change to a product subject to a set of rules, determining whether the change is incompatible with the set of rules, and when the change is determined to be incompatible with the set of rules, prompting the user to modify the change without storing the data associated with the change in a dynamic database residing on the cloud network. However, when the change is determined to be compatible with the set of rules, capturing data associated with the change in the dynamic database residing on a cloud network for first updating rules data, generating and uploading a data object as a microservice based on the first updated rules data, and versioning the product based on the set of rule objects associated with the product.

19 Claims, 7 Drawing Sheets

200

SYSTEM AND METHOD FOR CENTRALIZING RULE GENERATION ACROSS MULTIPLE SYSTEMS VIA MICROSERVICE

TECHNICAL FIELD

This disclosure generally relates to generating rule definitions using a cloud functionality, storing generated rule definitions in a centralized file store process, and processing rules from a centralized location for reducing overhead computing resource consumption for processing rule generation across multiple servers.

BACKGROUND

The developments described in this section are known to the inventors. However; unless otherwise indicated, it should not be assumed that any of the developments described in this section qualify as prior art merely by virtue of their inclusion in this section, or that those developments are known to a person of ordinary skill in the art.

Conventionally, certain products and/or product service offering may be provided to a user or consumer by a front office. As illustrated in FIG. 6, in order for the user or the consumer to utilize the provided products and/or product services, the products and/or product service offering must be processed by a middle office (e.g., onboarding) and subsequently by operations or back office (e.g., servicing). Each of the products and/or product services may have various requirements and attributes forming product definitions. Differing portions of product definition may be independently established by the front office (e.g., 20%) in its respective system, the middle office (e.g., 60%) in its respective system and the operations (e.g., 20%) in its respective system. From a data perspective, each of these three offices may be unaware of what the other offices are providing for the product definition.

As the product definition becomes progressively established, subsequent offices, such as the middle office or operations may find more information may be required, or that certain requirements or rules of the product definition may conflict, creating a toxic combination. When such toxic combinations are found later in the process, such as at the operations, the middle office and the front office may be required to modify, update and/or reprocess product definition information, which may lead to wasted computing resources (e.g., CPU, memory and etc.), as well as lost time and effort by all that may be involved in the process. Such back-and-forth required between the three offices may occur several times before a product definition may be finalized, and thus multiplying the amount of resources wasted in the process.

Further, product data of various organizations may be manually maintained, such as by spreadsheets. However, with ever increasing product/service codes, which may at times may be duplicated through various systems (e.g., front office system, middle office system and operations system), which may be difficult to keep track in uniform manner and leads to inefficient utilization of computing resources due to redundancies. Due to lack of a common structure in these systems, building packages may be challenging, fragmented, and inconsistent. Moreover, due to the above noted limitations, no versioning capability was available for versioning of a product.

SUMMARY

According to an aspect of the present disclosure, a method for centrally modifying a rule in a product definition is provided. The method includes executing, by a processor, receiving, from a user, a change to a product subject to a set of rules; determining, by a processor, whether the change is incompatible with the set of rules; when the change is determined to be incompatible with the set of rules, prompting the user to modify the change without storing the data associated with the change in a dynamic database residing on a cloud network; when the change is determined to be compatible with the set of rules, capturing data associated with the change in the dynamic database residing on the cloud network for first updating rules data; publishing, to rules engine serverless architecture, a first data update event; in response to receiving the first data update event, causing the rules engine serverless architecture to read first updated rules data from the dynamic database; generating a data object as a microservice based on the first updated rules data; uploading the data object to catalog rules architecture for first updating a set of rule objects associated with the product; and versioning the product based on the set of rule objects associated with the product.

According to another aspect of the present disclosure, the method further includes in response to the uploading of the data object, notifying a set of users of the product that an updated version of the product is available.

According to another aspect of the present disclosure, the data object is a rule engine object.

According to yet another aspect of the present disclosure, the notifying is performed using email transmissions.

According to another aspect of the present disclosure, multiple versions of the product is available for utilization.

According to a further aspect of the present disclosure, the method further includes transmitting, by catalog data architecture and to a data center residing outside of the cloud network and via a firewall, a request for smart approval; and receiving, by the catalog data architecture and from the data center, a response to the request for smart approval.

According to yet another aspect of the present disclosure, the method further includes capturing data associated with the response to the request for smart approval in the dynamic database residing on the cloud network for second updating rules data; publishing, to rules engine serverless architecture, a second data update event; in response to receiving the second data update event, causing the rules engine serverless architecture to read second updated rules data from the dynamic database; generating a second data object as a microservice based on the second updated rules data; and uploading the second data object to catalog rules architecture for second updating the set of rule objects associated with the product.

According to a further aspect of the present disclosure, one or more encryption key s are utilized to access the dynamic database, and in which the dynamic database is accessed at representational state transfer (REST).

According to another aspect of the present disclosure, the change to the product is inputted on a uniform template that is utilized by a front office, a middle office and operations responsible for generating the product.

According to a further aspect of the present disclosure, the determining of whether the change is incompatible with the set of rules includes whether the change is unable to be implemented together with at least one of the set of rules of the product.

According to a further aspect of the present disclosure, the catalog rules architecture stores or manages sets of rules associated with different versions of the product.

According to a further aspect of the present disclosure, the cloud network includes a catalog data architecture, the catalog rules architecture, the dynamic database, a rules engine serverless architecture and the digital platform notification serverless architecture.

According to a further aspect of the present disclosure, the uniform template is updated in response to the versioning.

According to a further aspect of the present disclosure, the method further includes obtaining a product block for the change, in which the product block combines with other product blocks to form the product.

According to a further aspect of the present disclosure, the determining of whether the change is incompatible with the set of rules includes, uploading the product block to a catalog data architecture for checking against attributes of existing product blocks.

According to a further aspect of the present disclosure, the method further includes in response to the determining of whether the change is incompatible with the set of rules, determining corresponding changes that should be implemented along with the change received from the user.

According to a further aspect of the present disclosure, the product includes a set of rules to abide by as initially specified by a configurator application in the data center.

According to a further aspect of the present disclosure, wherein the set of rules is configured to be updated by the user.

According to an aspect of the present disclosure, a system for centrally modifying a rule in a product definition is provided. The system includes a memory, a display and a processor. The system is configured to implement a cloud network architecture that includes a configurator user interface (UI), a catalog data architecture, a catalog rules architecture, a dynamic database, a rules engine serverless architecture and a digital platform notification serverless architecture. The system is further configured to perform: receiving, from a user, a change to a product subject to a set of rules; determining whether the change is incompatible with the set of rules; when the change is determined to be incompatible with the set of rules, prompting the user to modify the change without storing the data associated with the change in the dynamic database; when the change is determined to be compatible with the set of rules, capturing data associated with the change in the dynamic database for first updating rules data; publishing, to rules engine serverless architecture, a first data update event; in response to receiving the first data update event, causing the rules engine serverless architecture to read first updated rules data from the dynamic database; generating a data object as a microservice based on the first updated rules data; uploading the data object to catalog rules architecture for first updating a set of rule objects associated with the product; transmitting, by catalog data architecture and to a data center residing outside of the cloud network and via a firewall, a request for smart approval; receiving, by the catalog data architecture and from the data center, a response to the request for smart approval; capturing data associated with the response to the request for smart approval in the dynamic database for second updating rules data; publishing, to rules engine serverless architecture, a second data update event; in response to receiving the second data update event, causing the rules engine serverless architecture to read second updated rules data from the dynamic database; generating a second data object as a microservice based on the second updated rules data; uploading the second data object to catalog rules architecture for second updating the set of rule objects associated with the product; and versioning the product based on the set of rule objects associated with the product.

According to another aspect of the present disclosure, anon-transitory computer readable storage medium that stores a computer program for centrally modifying a rule in a product definition is provided. The computer program, when executed by a processor, causes a system to perform multiple processes including: receiving, from a user, a change to a product subject to a set of rules; determining whether the change is incompatible with the set of rules; when the change is determined to be incompatible with the set of rules, prompting the user to modify the change without storing the data associated with the change in a dynamic database residing on a cloud network; when the change is determined to be compatible with the set of rules, capturing data associated with the change in the dynamic database residing on the cloud network for first updating rules data; publishing, to rules engine serverless architecture, a first data update event; in response to receiving the first data update event, causing the rules engine serverless architecture to read first updated rules data from the dynamic database; generating a data object as a microservice based on the first updated rules data; uploading the data object to catalog rules architecture for first updating a set of rule objects associated with the product; transmitting, by catalog data architecture and to a data center residing outside of the cloud network and via a firewall, a request for smart approval; receiving, by the catalog data architecture and from the data center, a response to the request for smart approval; capturing data associated with the response to the request for smart approval in the dynamic database residing on the cloud network for second updating rules data; publishing, to rules engine serverless architecture, a second data update event; in response to receiving the second data update event, causing the rules engine serverless architecture to read second updated rules data from the dynamic database; generating a second data object as a microservice based on the second updated rules data; uploading the second data object to catalog rules architecture for second updating the set of rule objects associated with the product; and versioning the product based on the set of rule objects associated with the product.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
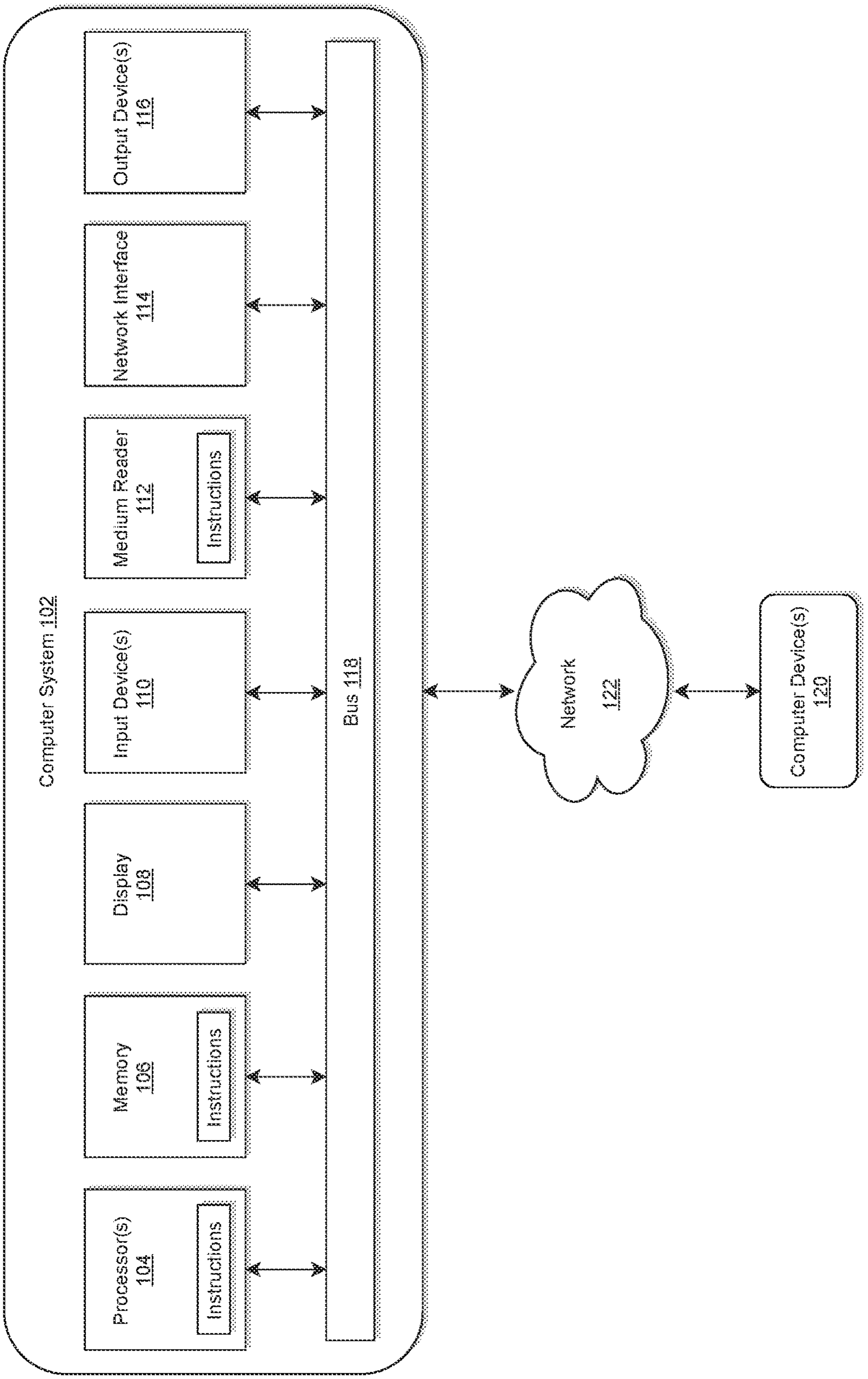
FIG. 1 illustrates a computer system for implementing a centralized rule system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a centralized rule system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal compute; a tablet computer, a set-top box, a personal digital assistant, a mobile device, a palmtop computer; a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last fora period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
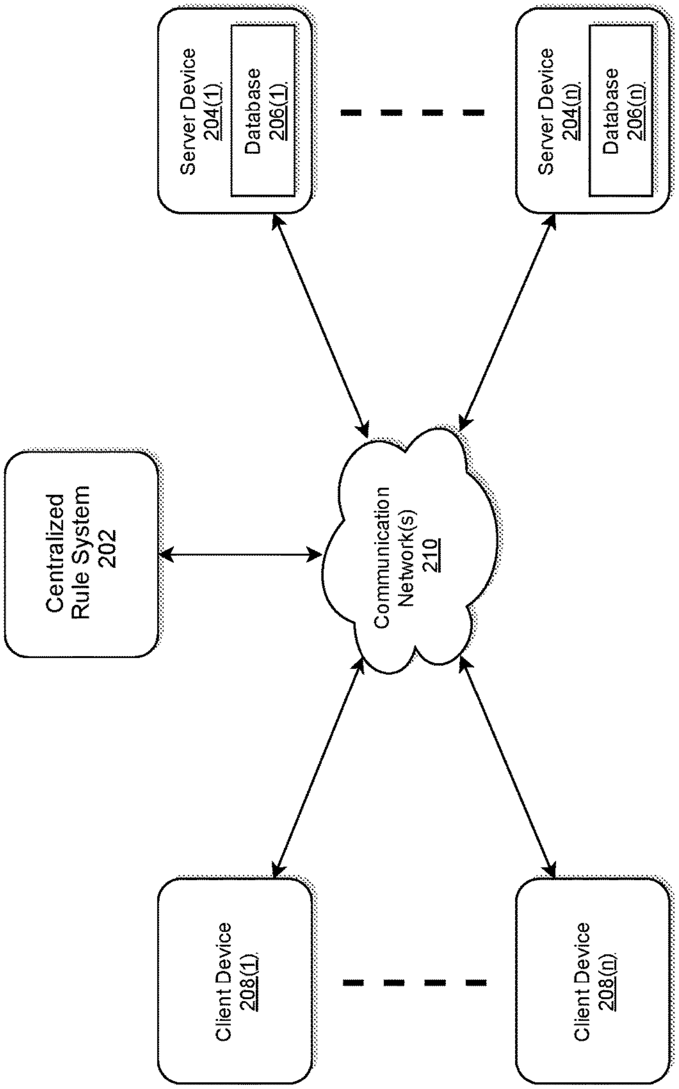
FIG. 2 illustrates an exemplary diagram of a network environment with a centralized rule system in accordance with an exemplary embodiment.

FIG. 2 illustrates an exemplary diagram of a network environment with a centralized rule system in accordance with an exemplary embodiment.

A centralized rule system 202 may be implemented with one or more computer systems similar to the computer system 102 as described with respect to FIG. 1.

The centralized rule system 202 may store one or more applications that can include executable instructions that, when executed by the centralized rule system 202, cause the centralized rule system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the centralized rule system 202 itself, may be located in virtual server(s) running in a cloud-based computing environment rather than being tied to one or more specific physical network computing devices. Also, the application(s) may be running in one or more virtual machines (VMs) executing on the centralized rule system 202. Additionally, in one or more embodiments of this technology, virtual machine(s) running on the centralized rule system 202 may be managed or supervised by a hypervisor.

In the network environment 200 of FIG. 2, the centralized rule system 202 is coupled to a plurality of server devices 204(1)-204(*n*) that hosts a plurality of databases 206(1)-206(*n*), and also to a plurality of client devices 208(1)-208(*n*) via communication network(s) 210. According to exemplary aspects, databases 206(1)-206(*n*) may be configured to store data that relates to distributed ledgers, blockchains, user account identifiers, biller account identifiers, and payment provider identifiers. A communication interface of the centralized rule system 202, such as the network interface 114 of the computer system 102 of FIG. 1, operatively couples and communicates between the centralized rule system 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the centralized rule system 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The centralized rule system 202 may be a standalone device or integrated with one or more other devices or apparatuses, such as one or more of the server devices 204(1)-204(*n*), for example. In one particular example, the centralized rule system 202 may be hosted by one of the server devices 204(1)-204(*n*), and other arrangements are also possible. Moreover, one or more of the devices of the centralized rule system 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the centralized rule system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

According to exemplary embodiments, the client devices 208(1)-208(*n*) in this example may include any type of computing device that can facilitate the implementation of the centralized rule system 202 that may efficiently provide a platform for implementing a cloud native centralized rule system module, but the disclosure is not limited thereto.

The client devices 208(1)-208(*n*) may run interface applications, such as standard web browsers or standalone client applications, which may provide an interface to communicate with the centralized rule system 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the centralized rule system 202, the server devices 204(1)-204(*n*), the client devices 208(1)-208(*n*), and the communication network(s) 210 are described and illustrated herein, other types and/or number is of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the centralized rule system 202, the server devices 204(1)-204(*n*), or the client devices 208(1)-208(*n*), for example, may be configured to operate as virtual instances on the same physical machine. For example, one or more of the centralized rule system 202, the server devices 204(1)-204(*n*), or the client devices 208(1)-208(*n*) may operate on the same physical device rather than as separate devices communicating through communication network(s) 210. Additionally, there may be more or fewer centralized rule system 202, server devices 204(1)-204(*n*), or client devices 208(1)-208(*n*) than illustrated in FIG. 2. According to exemplary embodiments, the centralized rule system 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
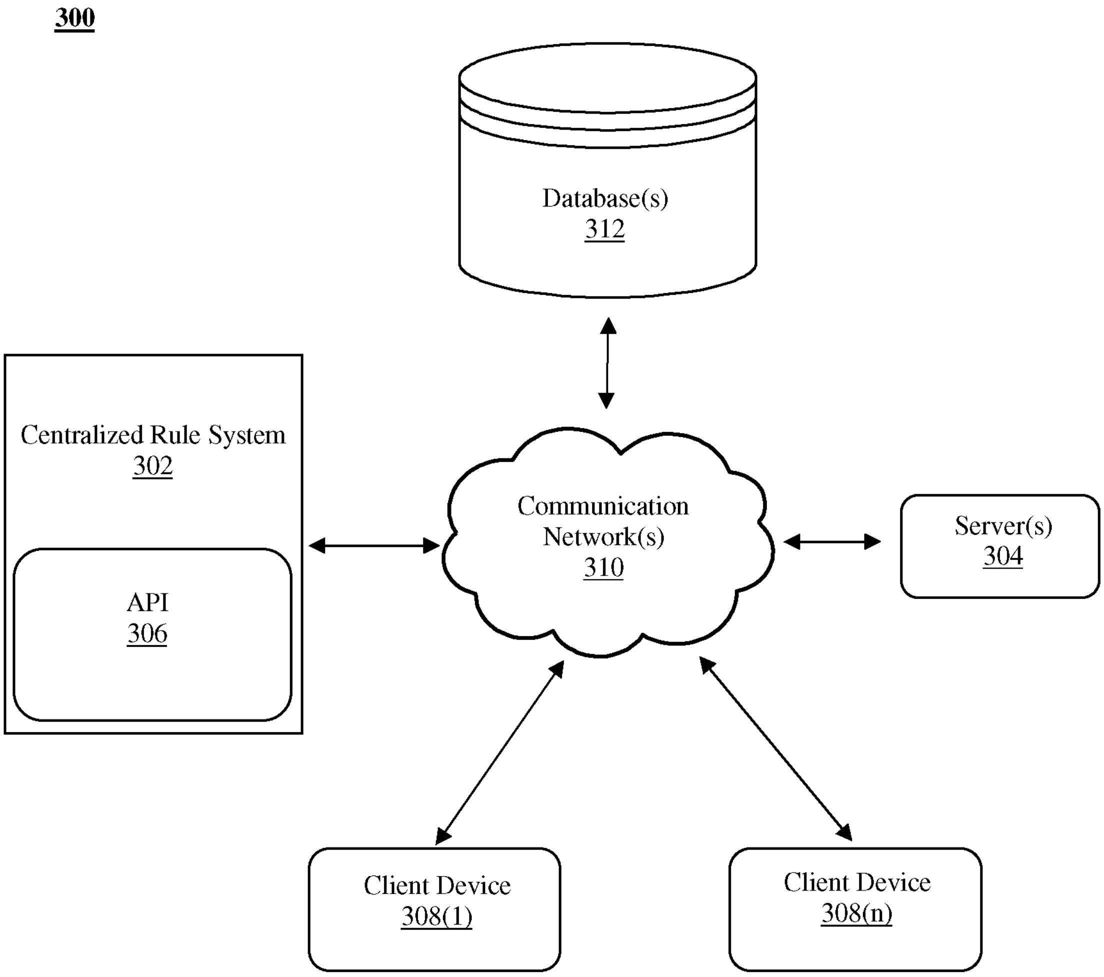
FIG. 3 illustrates a system diagram for implementing a centralized rule system in accordance with an exemplary embodiment.

FIG. 3 illustrates a system diagram for implementing a centralized rule system in accordance with an exemplary embodiment.

As illustrated in FIG. 3, the system 300 may include a centralized rule system 302 within which a group of API modules 306 is embedded, a server 304, a database(s) 312, a plurality of client devices 308(1) . . . 308(*n*), and a communication network 310.

According to exemplary embodiments, the centralized rule system 302 including the API modules 306 may be connected to the server 304, and the database(s) 312 via the communication network 310. Although there is only one database that has been illustrated, the disclosure is not limited thereto. Any number of databases may be utilized. The centralized rule system 302 may also be connected to the plurality of client devices 308(1) . . . 308(*n*) via the communication network 310, but the disclosure is not limited thereto.

According to exemplary embodiment, the centralized rule system 302 is described and shown in FIG. 3 as including the API modules 306, although it may include other rules, policies, modules, databases, or applications, for example. According to exemplary embodiments, the database(s) 312 may be embedded within the centralized rule system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(*n*) via the communication network 310.

The API modules 306 may be configured to implement a user interface (UI) platform that is configured to enable centralized rule system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(*n*) are illustrated as being in communication with the centralized rule system 302. In this regard, the plurality of client devices 308(1) . . . 308(*n*) may be "clients" of the centralized rule system 302 and are described herein as such. Nevertheless, it is to be known and understood that the plurality of client devices 308(1) . . . 308(*n*) need not necessarily be "clients" of the centralized rule system 302, or any entity described in association therewith herein. Any additional or alternative relationship may exist between either or both of the plurality of client devices 308(1) . . . 308(*n*) and the centralized rule system 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment one or more of the plurality of client devices 308(1) . . . 308(*n*) may communicate with the centralized rule system 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The centralized rule system 302 may be the same or similar to the centralized rule system 202 as described with respect to FIG. 2, including any features or combination of features described with respect thereto.

Figure 4A:
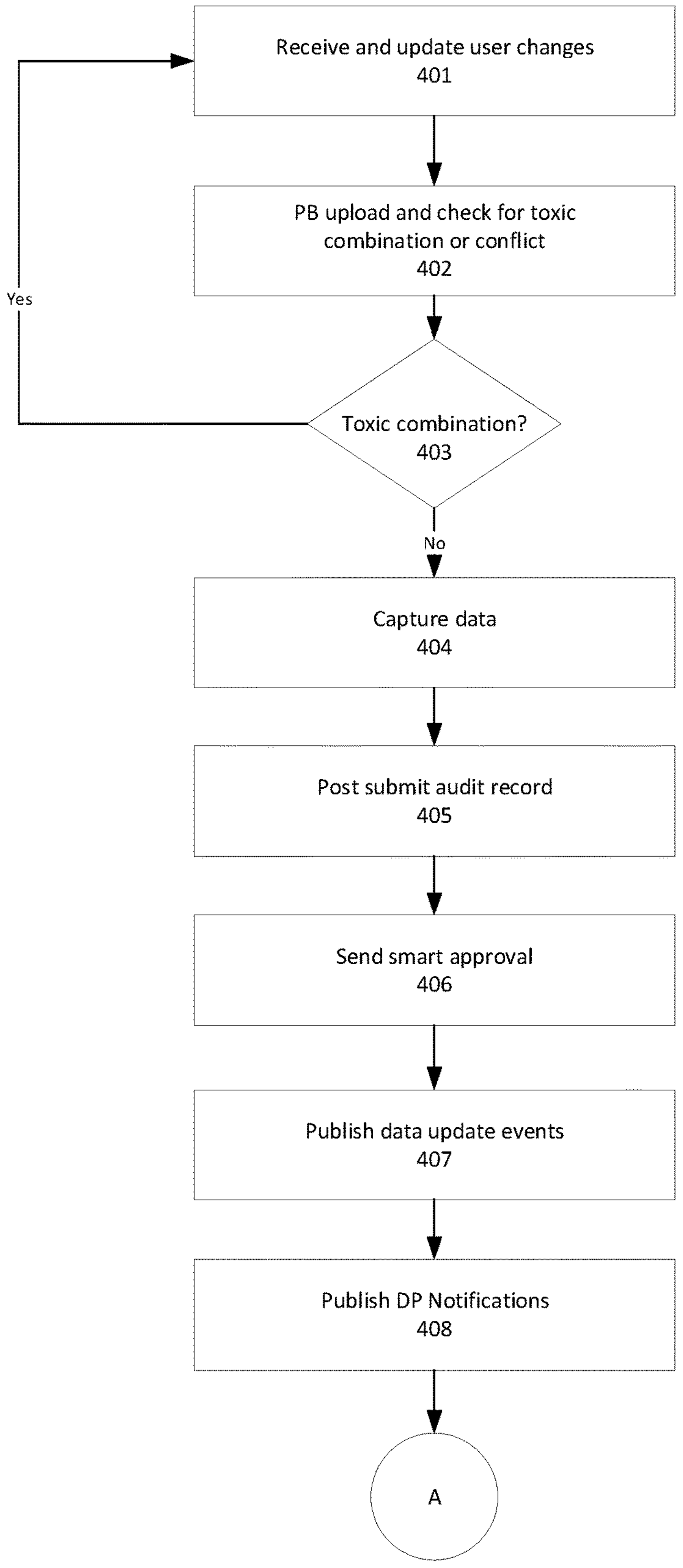
FIGS. 4A-4B illustrate a method for generating a centralized rule via microservices in accordance with an exemplary embodiment.
Figure 4B:
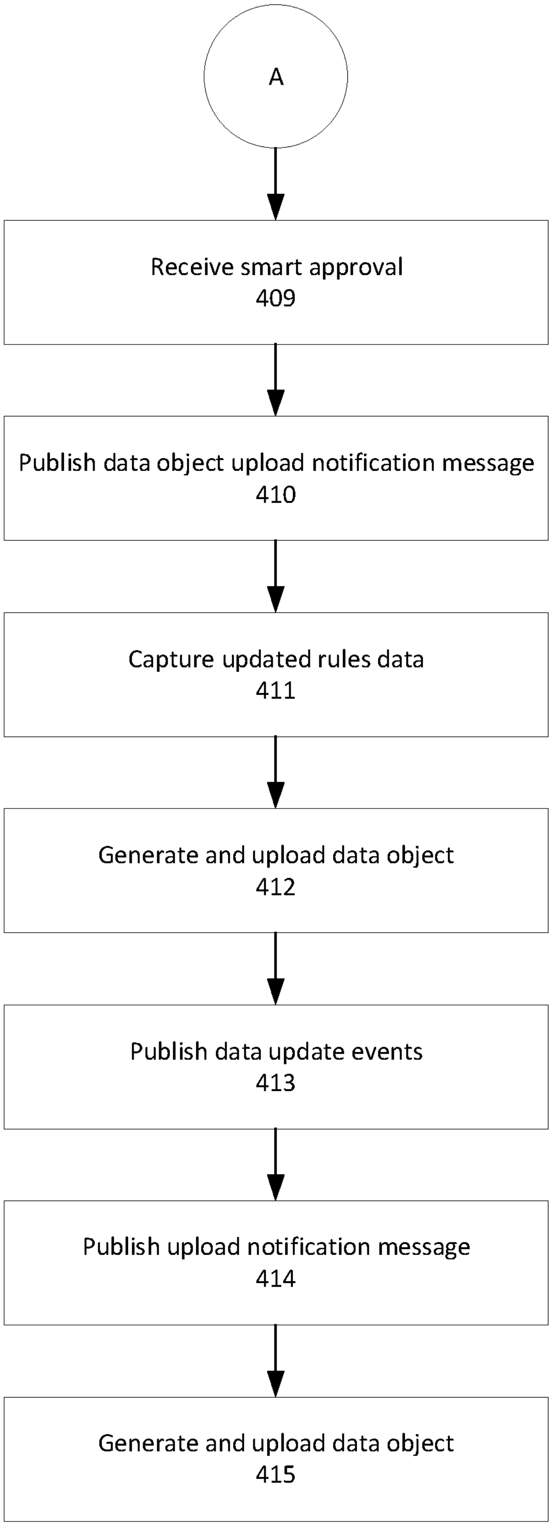

FIGS. 4A-4B illustrate a method for generating a centralized rule via microservices in accordance with an exemplary embodiment.

According to exemplary aspects, a centralized rule system may allow creation of new products or product definitions without requiring engineering team for the product build out. To enable quicker provisioning of new products in the back office or operations, the products configured by the front and middle office need to be error free and be free of toxic or incompatible combinations that may delay provisioning of the product. To mitigate this problem and improve the efficiency of the middle office onboarding and fulfillment, numerous permutation combination of rules at various hierarchy of a product and cross-product may be applied at run-time while gathering the requirements from external clients.

According to exemplary aspects, a product catalog may be utilized to provide a centralized, real-time datastore powered by APIs to store and retrieve product data across sales, on-boarding, and service systems. With built-in intelligence, the product catalog may provide a simplified user experience, enabling sales colleagues to select pre-defined products, build packages, expedite negotiations, and reduce client onboarding time.

According to exemplary aspects, product owners may have a capability to define custom business rules as part of dynamic product definition for the product catalog. For example, during a product configuration setup in the product catalog, if a user selects a wire product, then transaction services product may be configured to be displayed and indicated as being required.

Although, rules engine open source may be used as a centralized rules engine for executing such custom business rules during the product configuration setup, because the architecture of the rules engine is centralized, such custom business rules may not be able to be distributed. Further, rules engine architecture may not allow versioning of the custom business rules.

In order to facilitate the rule execution at run-time with large number of concurrent hits (e.g., 1000 hits/ms) and to be able to maintain this easily, the rule engine open source may be selected as an rules engine to execute these custom business rules as the data would be laid out flat and would be scalable and perform. However, the challenge with this approach is given the Architecture is centralized, distributed architecture may not be supported and versioning may not be allowed, which makes it difficult to dynamically update a product in real-time.

According to exemplary aspects, rules engine open source may be expanded into a micro-service and cloud native serverless architecture, which may enable building and distributing of micro-service and provide an ability to version business rules as a service. Each rules micro-service may be integrated with rules engine, which may load Rules Language and serves the business rules at runtime, that reduces computing capacity during service startup.

In view of the above noted concerns, each microservice may generate custom rules language during server startup, such that custom rules language generation may be offloaded using cloud native serverless architecture. As a result, a new version of a business rule may be dynamically published or ready to be served in near real-time.

In operation 401, a product owner make a change to a product definition, and the changes are then updated to catalog data services provided on a cloud network. According to exemplary aspects, the product owner may make the change to the product definition via a template that may be shared across a front office, a middle office and operations. In an example, the template may provide a uniform interface for inputting and viewing of information by independent entities/systems in near real-time. Further, based on utilization of the template or the uniform interface, various inconsistencies and duplicative information may be detected much earlier in the process and removed.

According to exemplary aspects, the centralized rule system may include the cloud network, an on-premise data center and a firewall that intermediates between the cloud services and the on-premise data center. Further, the cloud network includes catalog data services or architecture, catalog rules services or architecture, a dynamic database (DB), rules engine serverless services or architecture and digital platform (DP) notification serverless services or architecture. According to exemplary aspects, both the catalog data services and the catalog rules services may be included in an integrated console or architecture. In an example, a notification or publication of information to the catalog rules services may trigger notification to all of the consumers subscribed to a product for which a change has been implemented.

In operation 402, based on the requested or inputted change to the product by the product owner, a product block (PB) may be generated or obtained in the DP notification serverless services, which may include an event-driven, serverless computing platform that may execute code in response to an event, such as the requested or inputted change to the product. Based on the generated or obtained PB, the code may be executed to check the PB for possible toxic or incompatible combination with existing rules or PBs in operation 403. More specifically, the code may be executed to upload the PB to the catalog data services or architecture to check the uploaded PB against attributes of existing PBs forming the product or product definition. In an example, attributes may include geographic boundaries, time zone, entity type and the like. Moreover, the code may be executed to additionally check for other rules that may be additionally required or beneficial to the generated or obtained PB, which should be implemented together with the uploaded PB. In an example, PB may forma building data piece for a logical grouping of PBs, which may form a product or sell box (SB).

If the PB generated or obtained for the submitted change by the product owner does not create a toxic combination or otherwise create a conflict with existing rules for the respective product, the method may proceed to operation 404. However, if the PB generated or obtained for the submitted change by the product owner does create a toxic combination with existing rules or otherwise conflicts therewith, then the product owner may be prompted to modify the submitted change, and the product owner's modified change may be received for processing at operation 401.

At least since the check for toxic combination with other rules is performed prior to capturing data corresponding to the submitted change in the dynamic DB, unnecessary technical resources, such as memory and/or CPU, may not be expanded for capturing and processing information that cannot be utilized. Further, at least since such check is performed at the earlier stages of processing, rather than checking at the operations side near the end stages of processing as conventionally performed, technical resource expenditure may be more efficiently utilized and deployed. Also, unnecessary communications between the front office, middle office and operations may be reduced, while providing quicker implementation of the requested changes to a product.

In operation 404, the catalog data service may communicate with a dynamic database for capturing of data related to the change submitted by the product owner. According to exemplary aspects, the dynamic database may store various information of the rules associated with one or more products. The dynamic database may be read by the rule engine serverless services in response to an event or intermittently. According to exemplary aspects, the dynamic database may require one or more encryption keys or other authentication information for accessing the information stored in the dynamic database.

In operation 405, the DP notification serverless services uploads the PB to the catalog data services after the toxic combination (or other incompatibility) check is performed to post submit audit record.

In operation 406, once the PB is received and stored in the catalog data services, the catalog data services sends a smart approval request to the on-premise data center via the firewall for obtaining approval for the PB.

In operation 407, the catalog data services publishes data update event to the rules engine serverless services notifying of receiving and/or storing of the PB in the catalog data services. According to exemplary aspects, the operation 407 may be performed prior to receiving a response to the smart approval request. Upon receiving the update event message, the rules engine serverless services may be prompted to read the updated rules data from the dynamic database.

In operation 408, the catalog data services publishes a digital platform (DP) notification to the DP notification serverless services for notifying users, subscribers, or customers of the product of a change thereto. More specifically, upon receipt of the notification of storage of the PB in the catalog data services, the DP notification serverless services may inform the users, subscribers or customers of the product of the change in a digital platform, such as by email. However, aspects of the disclosure are not limited thereto, such that such notifications may be sent via text, electronic messaging, automated voice calls or the like.

In operation 409, the catalog data services receives a smart approval from the on-premise data center.

In operation 410, upon receipt of the smart approval by the catalog data services, the rules engine serverless services publishes a data object upload notification message to the catalog rules services.

In operation 411, after the catalog rules services receives the data object upload notification message, the dynamic DB captures updated data from the catalog data services. Further, upon receiving the data object upload notification message, the rules engine serverless services may be prompted to read the updated rules data from the dynamic database.

In operation 412, the rules engine serverless services may then generate a data object, such as custom rules object for the updated rules data read in operation 411. The data or rules object may then be stored onto an object storage in the rules engine serverless services and then uploaded onto the catalog rules services. According to exemplary aspects, the data or rules object may be stored as a microservice that may be deployed to form a product.

In operation 413, the catalog data services publishes data update events to the rules engine serverless services. Once the rules engine serverless services receives the data update event notification, the rules engine serverless services may transmit an email notification to the on-premise data center to inform users, subscribers or customers of the receiving and/or storing of the data or custom rules object in the catalog rules services. Although email notification is described in the present disclosure, aspects are not limited thereto, such that other digital communications, such as text, electronic messaging, a sound signal, automated voicemail or the like may be utilized.

In operation 414, the rules engine serverless services publishes the data or custom rules object upload notification message to the catalog rules services.

In operation 415, the rules engine serverless services may then generate a data object, such as custom rules object for the updated rules data read from the dynamic database. The data or custom rules object may then be stored onto an object storage in the rules engine serverless services and then corresponding custom rules language may be uploaded onto the catalog rules services. Further, upon receipt of the custom rules language, rules associated with the product may be deemed to have been changed, and versioning of new sets of rules associated with the product may be performed. Updated version information may be stored in a sell box version cache. Further, in response to updating of version information, a uniform template corresponding to the changed product may be updated. According to exemplary aspects, the centralized rule system may be capable of supporting the newer version as well as the older versions of the product.

Figure 5:
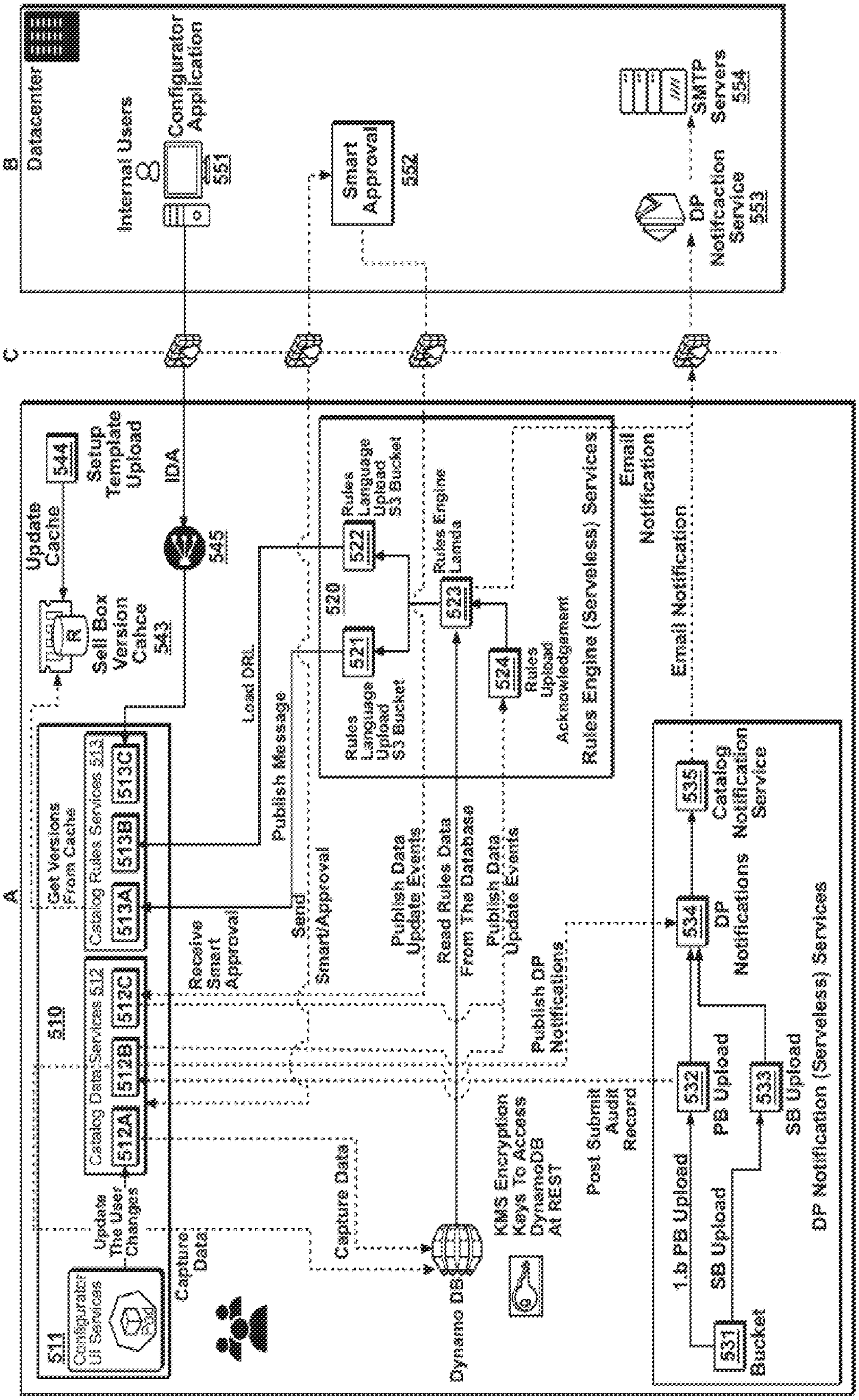
FIG. 5 illustrates a system flow of a centralized rule system in accordance with an exemplary embodiment.
Figure 6:
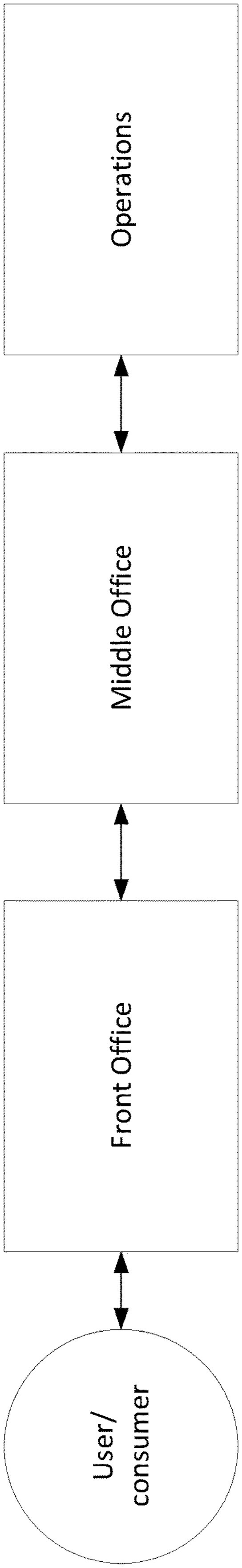
FIG. 6 PRIOR ART
FIG. 6 illustrates a conventional process flow for establishing a new product service to a consumer.

FIG. 5 illustrates a system flow of a centralized rule system in accordance with an exemplary embodiment.

According to exemplary aspects, a centralized rule system may include a cloud architecture A, a data center B and a firewall C. The cloud architecture A may communicate with the data center B that reside outside of a cloud network through a firewall C.

As illustrated in FIG. 5, the cloud architecture A includes an integrated console 510, rules engine serverless services 520 and digital platform (DP) notification serverless services 530. According to exemplary aspects, serverless computing may refer to a cloud computing execution model in which the cloud network allocates machine resources on demand, and thus taking care of servers on behalf of the cloud users. Accordingly, serverless computing architecture allows users to build and run applications and services without consideration of servers. As a result, computing resources may be more efficiently utilized as server resources are provided ad-hoc based on demand rather than static allocation. Further, the cloud architecture A additionally includes a dynamic database (DB) 541, one or more encryption keys 542, a sell box version cache 543, a setup template upload platform 544, and a network interface 545.

According to exemplary aspects, the integrated console 510 provides a single place to organize, visualize and troubleshoot Kubernetes applications or clusters. The integrated console 510 includes a configurator 511, catalog data services 512, and catalog rules services 513. Although two catalog data services are illustrated in FIG. 5, aspects of the present disclosure are not limited thereto, such that more catalog data services may be utilized. The catalog data services 512 includes a data services API 512A, a data audit API 512B, and a distributed message queuing service publisher 512C. The catalog rules services 513 includes a streaming data service consumer 513A, a web service interfacing object storage service download 513B and a rules API 513C.

According to exemplary aspects, the configurator 511 is a configurator of user interface (UI) services. The configurator 511 includes a Kubernetes pod. The configurator 511 may update one or more changes in a product to the catalog data services 512. According to exemplary aspects, one or more changes may be requested via a uniform template that may be accessible and utilized by a front office, middle office and operations.

The data services API 512A and the data audit API 512B of the catalog data services 512 may communicate with the dynamic DB 541 for capturing of data related to the requested changes to the product by the dynamic DB 541. In an example, the one or more encryption keys 542 may be utilized for accessing the dynamic DB 541 at representational state transfer (REST).

According to exemplary aspects, the data services API 512A and the data audit API 512B of the catalog data services 512 may communicate with the dynamic DB 541 at different times. The data audit API 512B may also publish DP notifications to the DP notification message queue service 534 for informing various users, subscribers or customers of the product.

Moreover, the catalog data services 512 may transmit a smart approval request through the firewall C to a smart approval service 552 residing in the data center B. The smart approval service 552 in turn may transmit, through the firewall C, an approval to the catalog data services 512. After the catalog data services 512 transmit the smart approval request to the smart approval service 552, the data audit API 512B and/or the rules API 513C of the catalog data services 512 may publish data update events to a rules upload acknowledgement message queue service 524 of the rules engine serverless service 520.

The streaming data service consumer 513A may store or manage a list of consumers associated with the product that may be alerted when a new version of a product is available. The web service interfacing object storage service download 513B may store or manage custom rules language uploaded from a rule engine upload bucket 522. The rules API 513C may store or manage sets of rules associated with different versions of the product.

The catalog rules services 513 may communicate with the sell box cache 543 to update or obtain rule versions. For example, when the catalog rules services 513 receives a data or custom rules object for a requested change to a product, the centralized rule system determines that a new version of the product has been formed including a different set of rules, and versioning of the product is performed, and version (both old and new) may be stored in the sell box cache 543. The setup template upload platform 544 may update cache of the sell box version cache 543.

According to exemplary aspects, the rules engine serverless service 520 includes a custom rules upload notification service 521, the custom rules upload bucket 522, a rules engine 523, and the rules upload acknowledgement message queue service 524. According to exemplary aspects, the custom rules upload notification service 521 may be a streaming data service that manages Apache Kafka infrastructure and operations, which allows developers to run Apache Kafka applications and Kafka Connect connectors in a cloud network. In an example, the custom rules upload notification service 521 may be responsible for sending custom rules object upload notifications. The custom rules upload notification service 521 may publish the upload notifications to the streaming data service consumer 513A for informing streaming data service consumers of a new data or custom rules object reflecting a change for an existing product.

According to exemplary aspects, the custom rules upload bucket 522 may store data as data or custom rules objects. The custom rules upload bucket 522 may upload the data or custom rules objects to the web service interfacing object storage service download 513B. In an example, the data or custom rules object may be uploaded as custom rules language.

According to exemplary aspects, the rules engine 523 may be a provision less or managing serverless computing service. The rules engine 523 may be an event-driven, serverless computing platform that allows to run code in response to events and automatically manages computing resources by that code. Accordingly, at least since computing resources are expanded to respond to an event, computing resources may be more efficiently allocated for handling more events with less computing resources than conventional systems.

The rules engine 523 may read rules data from the dynamic database 541 in response to receiving an event notification, such as data update event. The rules engine 523 may generate a data object or custom rules object based on the updated rules data read from the dynamic database 541. The rules engine 523 may communicate generation of the data objector custom rules object to the custom rules upload notification service 521 and the custom rules upload bucket 522. Further, the rules engine 523 may transmit an email notification to a DP notification service 553 through the firewall C, which is then transferred to simple mail transfer protocol (SMTP) servers 554.

According to exemplary aspects, the rules upload acknowledgement message queue service 524 may allow the rules engine serverless services 520 to send, store and receive messages between software components at any volume. For example, the rules upload acknowledgement message queue service 524 may send, receive and store rules upload acknowledgements. The rules upload acknowledgement message queue service 524 receives data update events from the distributed message queuing service publisher 512C and/or data audit 512B.

According to exemplary aspects, the DP notification serverless services 530 includes an object bucket 531, a product block (PB) upload service 532, a sell box (SB) upload service 533, a DP notification message queue service 534, and a catalog notification service 535.

According to exemplary aspects, the object bucket 531 may refer to an object storage service that stores data as objects in the object bucket 531. The object bucket 531 transmits a PB upload to the PB upload service 532, and transmits an SB upload to the SB upload service 533. The PB upload service 532 may post submit audit record to the data audit API 512B for determining whether the uploaded PB creates a toxic or incompatible combination with existing rules or other PBs. If the data audit API 512B determines that the PB creates a toxic or incompatible combination with existing rules or other PBs, the user requesting changes to the product may be prompted to modify the request. On the other hand, if the data audit API 512B determines that no such toxic or incompatible combination exists, then the PB is processed further to create a new version of the product, which may include a set of rules that may be different from previous versions of the product.

The PB upload service 532 and the SB upload service 533 may transmit to the DP notification message queue service 534. The DP notification message queue service 534 also receives published DP notification data from the data audit API 512B. The DP notification message queue service 534 may transmit the obtained data from (i) the PB upload service 532, (ii) the SB upload service 533, and/or (iii) the data audit API 512B, to the catalog notification service 535. The catalog notification service 535 may then sends an email notification to the data center B, more specifically, to the DP notification service 553 through the firewall C, which is then to the SMTP servers 554. Although email notification is described as being utilized in the present disclosure for communication of notifications, aspects of the present disclosure are not limited thereto, such that other electronic forms of communication may be utilized, such as text, images, video, voice and the like.

Further, the data center B includes a configurator application computer 551, a smart approval system 552, the DP notification service 553 and the SMTP servers 554. According to exemplary aspects, the configurator application computer 551 may initially establish a set of rules, such as geographic boundary of operation, to abide for a product. Further; the data center B may be an on-premise facility residing outside of the cloud network. The smart approval 552 may operate to approve or deny change request to a product before being fully implemented to the product.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for centrally modifying a rule in a product definition, the method comprising:

generating, by a set of microservices of a rules engine serverless architecture that resides on a cloud network, a custom rules language that comprises at least one rule;

receiving, from a user, a change to a product that is subject to a plurality of rules of the custom rules language;

retrieving, by the rules engine serverless architecture, the plurality of rules from a dynamic database that resides on the cloud network;

checking, by the rules engine serverless architecture, the change against the plurality of rules to determine:

whether the change conflicts with the plurality of rules; and whether combining the change with the plurality of rules produces a toxic combination;

when the change does not produce the toxic combination and does not conflict with the plurality of rules, capturing data associated with the change in the dynamic database residing on the cloud network for first updating rules data;

publishing, to the rules engine serverless architecture, a first data update event;

in response to the publishing of the first data update event, causing the rules engine serverless architecture to read first updated rules data from the dynamic database;

generating a data object as a first new microservice based on the first updated rules data;

uploading the data object to catalog rules architecture for first updating a set of rule objects associated with the product; and versioning the product based on the set of rule objects associated with the product, wherein the toxic combination comprises combinations that raise issues that require at least one from among a modification, an update, and reprocessing product definition information, and wherein the determining of whether the change conflicts with the plurality of rules includes, uploading the product block to a catalog data architecture for checking against attributes of existing product blocks.

2. The method according to claim 1, further comprising: in response to the uploading of the data object, notifying a plurality of users of the product that an updated version of the product is available.

3. The method according to claim 1, wherein the data object is a custom rules object.

4. The method according to claim 2, wherein the notifying is performed using email transmissions.

5. The method according to claim 1, wherein a plurality of versions of the product is available for utilization.

6. The method according to claim 1, further comprising:

transmitting, by catalog data architecture and to a data center residing outside of the cloud network and via a firewall, a request for smart approval; and receiving, by the catalog data architecture and from the data center, a response to the request for the smart approval.

7. The method according to claim 6, further comprising:

capturing data associated with the response to the request for the smart approval in the dynamic database residing on the cloud network for second updating rules data;

publishing, to rules engine serverless architecture, a second data update event;

in response to receiving the second data update event, causing the rules engine serverless architecture to read second updated rules data from the dynamic database;

generating a second data object as a second new microservice based on the second updated rules data; and uploading the second data object to catalog rules architecture for second updating the set of rule objects associated with the product.

8. The method according to claim 1, wherein one or more encryption keys are utilized to access the dynamic database, and wherein the dynamic database is accessed at representational state transfer (REST).

9. The method according to claim 1, wherein the change to the product is inputted on a uniform template that is utilized by a front office, a middle office and operations responsible for generating the product.

10. The method according to claim 1, wherein determining whether the change conflicts with the plurality of rules, includes determining whether the change is unable to be implemented together with at least one of the plurality of rules of the product.

11. The method according to claim 1, wherein the catalog rules architecture stores sets of rules associated with different versions of the product.

12. The method according to claim 1, wherein the cloud network includes a catalog data architecture, the catalog rules architecture, the dynamic database, the rules engine serverless architecture and the digital platform notification serverless architecture.

13. The method according to claim 9, wherein the uniform template is updated in response to the versioning.

14. The method according to claim 1, further comprising obtaining a product block for the change, wherein the product block combines with other product blocks to form the product.

15. The method according to claim 1, further comprising, in response to determining that the change conflicts with the plurality of rules, determining corresponding changes that should be implemented along with the change received from the user.

16. The method according to claim 1, wherein the product includes a set of rules to abide by as initially specified by a configurator application in the data center.

17. The method according to claim 16, wherein the set of rules is configured to be updated by the user.

18. A system to provide for centrally modifying a rule in a product definition, the system comprising:

at least one memory; and at least one processor;

wherein the system is configured to implement a cloud network architecture that includes a configurator user interface (UI), a catalog data architecture, a catalog rules architecture, a dynamic database, a rules engine serverless architecture that resides on the cloud network architecture, and a digital platform notification serverless architecture, and wherein the system is configured to perform operations that include:

generating, by a set of microservices of the rules engine serverless architecture, a custom rules language that comprises at least one rule;

receiving, from a user, a change to a product that is subject to a plurality of rules of the custom rules language;

retrieving, by the rules engine serverless architecture, the plurality of rules from a dynamic database that resides on the cloud network;

checking, by the rules engine serverless architecture, the change against the plurality of rules to determine:

whether the change conflicts with the plurality of rules; and whether combining the change with the plurality of rules produces a toxic combination;

when the change is determined to be incompatible with the plurality of rules, prompting the user to modify the change without storing the data associated with the change in the dynamic database;

when the change does not produce the toxic combination and does not conflict with the plurality of rules, capturing data associated with the change in the dynamic database;

publishing, to the rules engine serverless architecture, a first data update event;

in response to the publishing of the first data update event, causing the rules engine serverless architecture to read first updated rules data from the dynamic database;

generating a data object as a first new microservice based on the first updated rules data;

uploading the data object to catalog rules architecture for first updating a set of rule objects associated with the product;

transmitting, by catalog data architecture and to a data center residing outside of the cloud network and via a firewall, a request for smart approval;

receiving, by the catalog data architecture and from the data center, a response to the request for smart approval;

capturing data associated with the response to the request for smart approval in the dynamic database for second updating rules data;

publishing, to rules engine serverless architecture, a second data update event;

in response to receiving the second data update event, causing the rules engine serverless architecture to read second updated rules data from the dynamic database;

generating a second data object as a second new microservice based on the second updated rules data;

uploading the second data object to catalog rules architecture for second updating the set of rule objects associated with the product; and versioning the product based on the set of rule objects associated with the product, wherein the toxic combination comprises combinations that raise issues that require at least one from among a modification, an update, and reprocessing product definition information, and wherein the determining of whether the change conflicts with the plurality of rules includes, uploading the product block to a catalog data architecture for checking against attributes of existing product blocks.

19. A non-transitory computer readable storage medium that stores a computer program for centrally modifying a rule in a product definition, the computer program, when executed by a processor, causing a system to perform a plurality of processes comprising:

generating, by a set of microservices of a rules engine serverless architecture that resides on a cloud network, a custom rules language that comprises at least one rule;

receiving, from a user, a change to a product that is subject to a plurality of rules of the custom rules language;

retrieving, by the rules engine serverless architecture, the plurality of rules from a dynamic database that resides on the cloud network;

checking, by the rules engine serverless architecture, the change against the plurality of rules to determine:

whether the change conflicts with the plurality of rules; and whether combining the change with the plurality of rules produces a toxic combination;

when the change does not produce the toxic combination and does not conflict with the plurality of rules, capturing data associated with the change in the dynamic database residing on the cloud network for first updating rules data;

publishing, to the rules engine serverless architecture, a first data update event;

in response to the publishing of the first data update event, causing the rules engine serverless architecture to read first updated rules data from the dynamic database;

generating a data object as a first new microservice based on the first updated rules data;

uploading the data object to catalog rules architecture for first updating a set of rule objects associated with the product;

transmitting, by catalog data architecture and to a data center residing outside of the cloud network and via a firewall, a request for smart approval;

receiving, by the catalog data architecture and from the data center, a response to the request for smart approval;

capturing data associated with the response to the request for smart approval in the dynamic database residing on the cloud network for second updating rules data;

publishing, to rules engine serverless architecture, a second data update event;

in response to receiving the second data update event, causing the rules engine serverless architecture to read second updated rules data from the dynamic database;

generating a second data object as a second new microservice based on the second updated rules data;

uploading the second data object to catalog rules architecture for second updating the set of rule objects associated with the product; and versioning the product based on the set of rule objects associated with the product, wherein the toxic combination comprises combinations that raise issues that require at least one from among a modification, an update, and reprocessing product definition information, and wherein the determining of whether the change conflicts with the plurality of rules includes, uploading the product block to a catalog data architecture for checking against attributes of existing product blocks.

* * * * *